United States Patent
Amoateng et al.

(10) Patent No.: US 12,254,039 B2
(45) Date of Patent: Mar. 18, 2025

(54) USER INTERFACE INCLUDING PERSONALIZED FEED WITH DYNAMICALLY GENERATED PROMPTS

(71) Applicant: Microsoft Technology Licensing, LLC, Redmond, WA (US)

(72) Inventors: Yaw Oduro Amoateng, Redmond, WA (US); Roberta Cannerozzi, Bellevue, WA (US); Jeremy Michael Grubaugh, Kirkland, WA (US); Graham Kent, Seattle, WA (US); Adam Douglas Troy, Seattle, WA (US); Aaron John Cronin, Oslo (NO); Ola Natvig, Trondheim (NO); Åsmund Grammeltvedt, Tromso (NO); Roman Werpachowski, Arneberg (NO); Wei-Han Chang, Seattle, WA (US); Maya Angele Pelichet, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/125,286

(22) Filed: Mar. 23, 2023

(65) Prior Publication Data
US 2024/0320257 A1    Sep. 26, 2024

(51) Int. Cl.
G06F 16/435    (2019.01)
G06F 3/0482    (2013.01)
(Continued)

(52) U.S. Cl.
CPC .......... *G06F 16/435* (2019.01); *G06F 3/0482* (2013.01); *G06F 16/24578* (2019.01);
(Continued)

(58) Field of Classification Search
CPC ................ G06F 16/435; G06F 3/0482; G06F 16/24578; G06F 16/438; G06F 40/166; G06F 40/40; G06T 11/00
(Continued)

(56) References Cited

U.S. PATENT DOCUMENTS 10,684,738 B1 * 6/2020 Sicora ................... G06F 3/0485
2019/0273701 A1 * 9/2019 Basheer ................. H04L 51/02
(Continued)

*Primary Examiner* — Phong H Nguyen
(74) *Attorney, Agent, or Firm* — NovoTechIP International PLLC

(57) ABSTRACT

The disclosed technology is generally directed to a personalized feed. In one example of the technology, selected key-value pairs from a profile associated with a user are provided. Based on a prompt that includes natural-language text instructions, the selected key-value pairs, and ranked content, a large language model is used to generate: pill prompts associated with the ranked content, such that the pill prompts are information requests that are unique and personalized to have particular relevance to the user based on selected key-value pairs, and a response to each pill prompt such that the response includes content corresponding to the requested information. A content feed is displayed to the user, including displaying selectable pills to the user as part of the displayed content feed such that each selectable pill includes a corresponding pill prompt. The response to the pill prompt that corresponds to the selection is displayed to the user.

18 Claims, 6 Drawing Sheets

(51) Int. Cl.
  *G06F 16/2457* (2019.01)
  *G06F 16/438* (2019.01)
  *G06F 40/166* (2020.01)
  *G06F 40/40* (2020.01)
  *G06T 11/00* (2006.01)

(52) U.S. Cl.
  CPC .......... *G06F 16/438* (2019.01); *G06F 40/166* (2020.01); *G06F 40/40* (2020.01); *G06T 11/00* (2013.01)

(58) Field of Classification Search
  USPC ........ 707/706, 722, 728, 732, 734, 748, 769
  See application file for complete search history.

(56) References Cited

U.S. PATENT DOCUMENTS

| | | | |
|---|---|---|---|
| 2020/0106721 A1* | 4/2020 | Mithal | H04L 51/10 |
| 2021/0365511 A1* | 11/2021 | Matloub | G06F 16/9538 |
| 2022/0188361 A1* | 6/2022 | Botros | G02B 27/01 |

\* cited by examiner

USER INTERFACE INCLUDING PERSONALIZED FEED WITH DYNAMICALLY GENERATED PROMPTS

BACKGROUND

Typically, a content feed is a mechanism for providing content to users without requiring users to manually access the content from the content sources. For example, a content network may generate a news feed of photos, audio, video, documents, articles, and/or other content items that are shared by members of the content network for each user accessing the content network. The user may then click on a posting of the content item within the news feed to navigate to a website on which the content item is hosted and access the entirety of the content item.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed a personalized feed. Ranked content that is associated with a first user is requested. Responsive to requesting the ranked content, the ranked content is received, such that the ranked content is ranked based on a relevance of content among the ranked content to first user. A first profile that is associated with the first user is requested. The first profile includes a plurality of key-value pairs. Responsive to requesting the first profile, the first profile is received. A plurality of selected key-value pairs from the first profile is provided. A first prompt is provided such that the first prompt includes natural-language text instructions. Based on the first prompt, the plurality of selected key-value pairs, and the ranked content, a large language model is used to generate: a plurality of pill prompts associated with the ranked content, such that the pill prompts are information requests that are unique and personalized to have particular relevance to the first user based on the plurality of selected key-value pairs, and a response to each pill prompt of the plurality of pill prompts such that the response includes content that corresponds to the requested information. A content feed is caused to be displayed to the first user, including causing a plurality of selectable pills to be displayed to the first user as part of the displayed content feed such that each selectable pill of the plurality of selectable pills includes a corresponding pill prompt of the plurality of pill prompts. A selection of one of the selectable pills of the plurality of selectable pills is received. Responsive to the selection of one of the selectable pills, the response to the pill prompt that corresponds to the selection is caused to be displayed to the first user.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

A productivity service may be used to provide various services to users, including cloud services, access to various applications, communications services, security services, device management services, meeting management services, services that manage relationships with other users, news post management services, file services including the storing, access, and sharing of files by the users, or the like. The productivity service may also provide a content feed to each user. The content feed for each users includes feed items. Each feed item corresponds to a content item, which may be a document, news post, meeting, or other suitable content item that has relevance to the user. The feed is displayed to the users via a user interface and is personalized to each user, where the personalization is accomplished using a large language model (LLM) and provided as part of a user interface.

In some examples, each of the feed items displayed to a user via the user interface includes a personalized title, a personalized summary of the corresponding content item, and a personalized picture. Each feed item also includes multiple personalized pills/prompts that are displayed to the user via the user interface. The personalized pills are user-selectable buttons that contain a request for information of particular relevance to the user. Each of the requests in the personalized pills of each feed item is an information request that is related to the piece of content/content item that corresponds to feed item. The feed also includes global pills that contain more general information requests of relevance to the user that are not limited to being about one particular feed item. The user interface provides a response to the information request made in a pill when the pill is selected by the user.

Illustrative Systems

Figure 1:
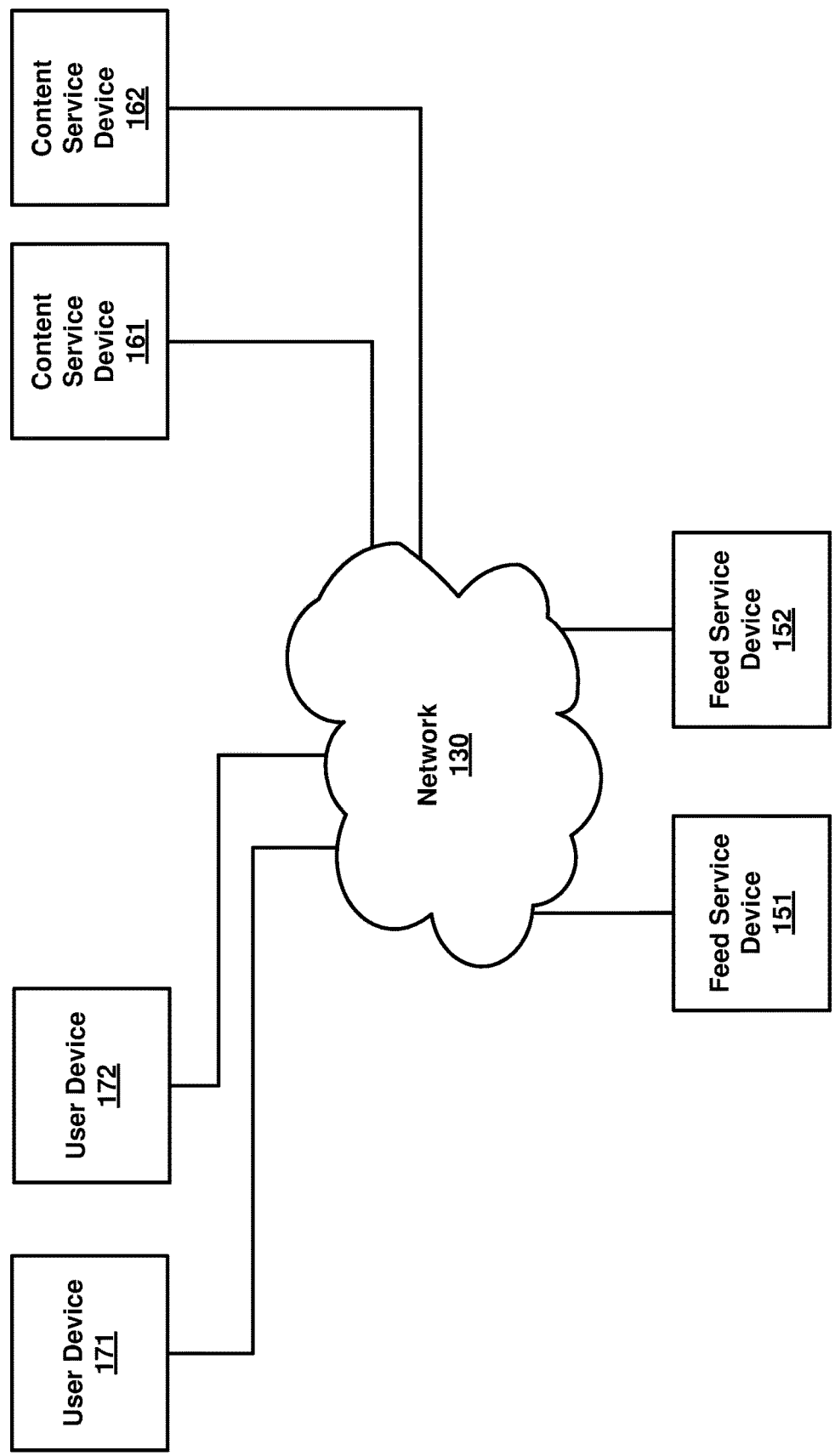
FIG. 1 is a block diagram illustrating an example of a network-connected system.

FIG. 1 is a block diagram illustrating an example of a system (100). FIG. 1 and the corresponding description of FIG. 1 in the specification illustrate an example system for illustrative purposes that does not limit the scope of the disclosure. System 100 is described as follows in accordance with some examples. System 100 includes network 130, as well as feed service devices 151 and 152, content service devices 161 and 162, and user devices 171 and 172, which all connect to network 130.

Figure 6:
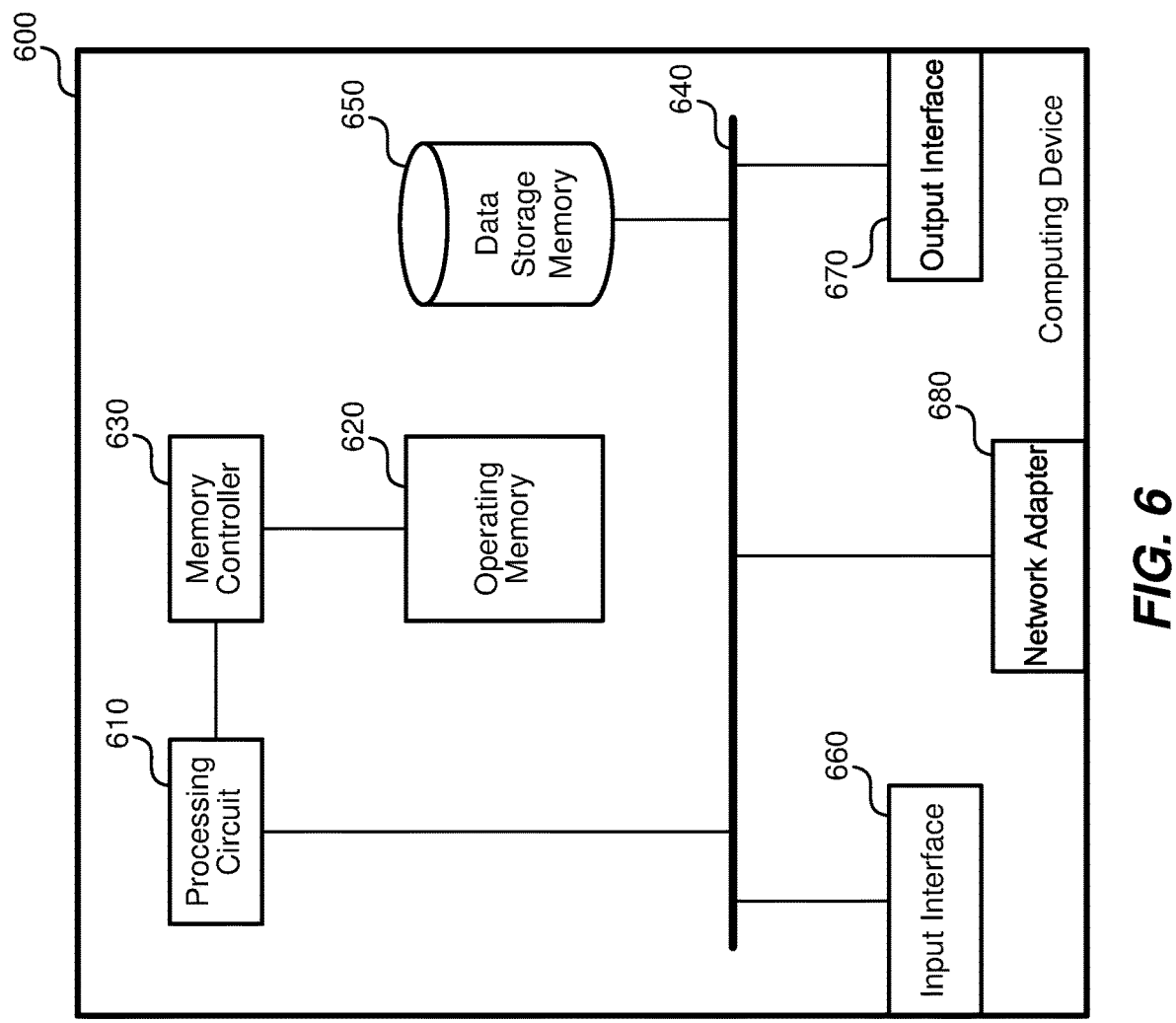
FIG. 6 is a block diagram illustrating one example of a suitable computing device, according to aspects of the disclosed technology.

Each feed service device 151 and 152, content service device 161 and 162, and user device 171 and 172 includes examples of computing device 600 of FIG. 6. Each of feed service devices 151 and 152 and content service devices 161 and 162 is part of one or more distributed systems.

Content service devices, including content service devices 161 and 162, manage, on behalf of users, various services that are associated with content. The services may include cloud services, access to various applications, communications services, security services, device management services, meeting management services, services that manage relationships with other users, news post management services, file services including the storing, access, and sharing of files by the users, or the like. Users of the services may obtain the service by communication via user devices, such as user devices 171 and 172, to the content service devices.

Feed services devices, including feed service services 151 and 152 provide feed services to users. The feed services provide a personalized content feed to each user. The personalized content feed for each users includes dynamically generated user-interactive selectable smart prompts that are unique to that user and personalized to have particular relevance to that user.

Network 130 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, and/or other communications links known to those skilled in the art. Furthermore, remote computers and other related electronic devices could be remotely connected to either LANs or WANs via a modem and temporary telephone link. Network 130 may include various other networks such as one or more networks using local network protocols such as 6LOWPAN, ZigBee, or the like. In essence, network 130 may include any suitable network-based communication method by which information may travel among feed service devices 151 and 152, content service devices 161 and 162, and user devices 171 and 172. Although each device is shown connected as connected to network 130, that does not necessarily mean that each device communicates with each other device shown. In some examples, some devices shown only communicate with some other devices/services shown via one or more intermediary devices. Also, although network 130 is illustrated as one network, in some examples, network 130 may instead include multiple networks that may or may not be connected with each other, with some of the devices shown communicating with each other through one network of the multiple networks and other of the devices shown instead communicating with each other with a different network of the multiple networks.

System 100 may include more or less devices than illustrated in FIG. 1, which is shown by way of example only.

Figure 2:
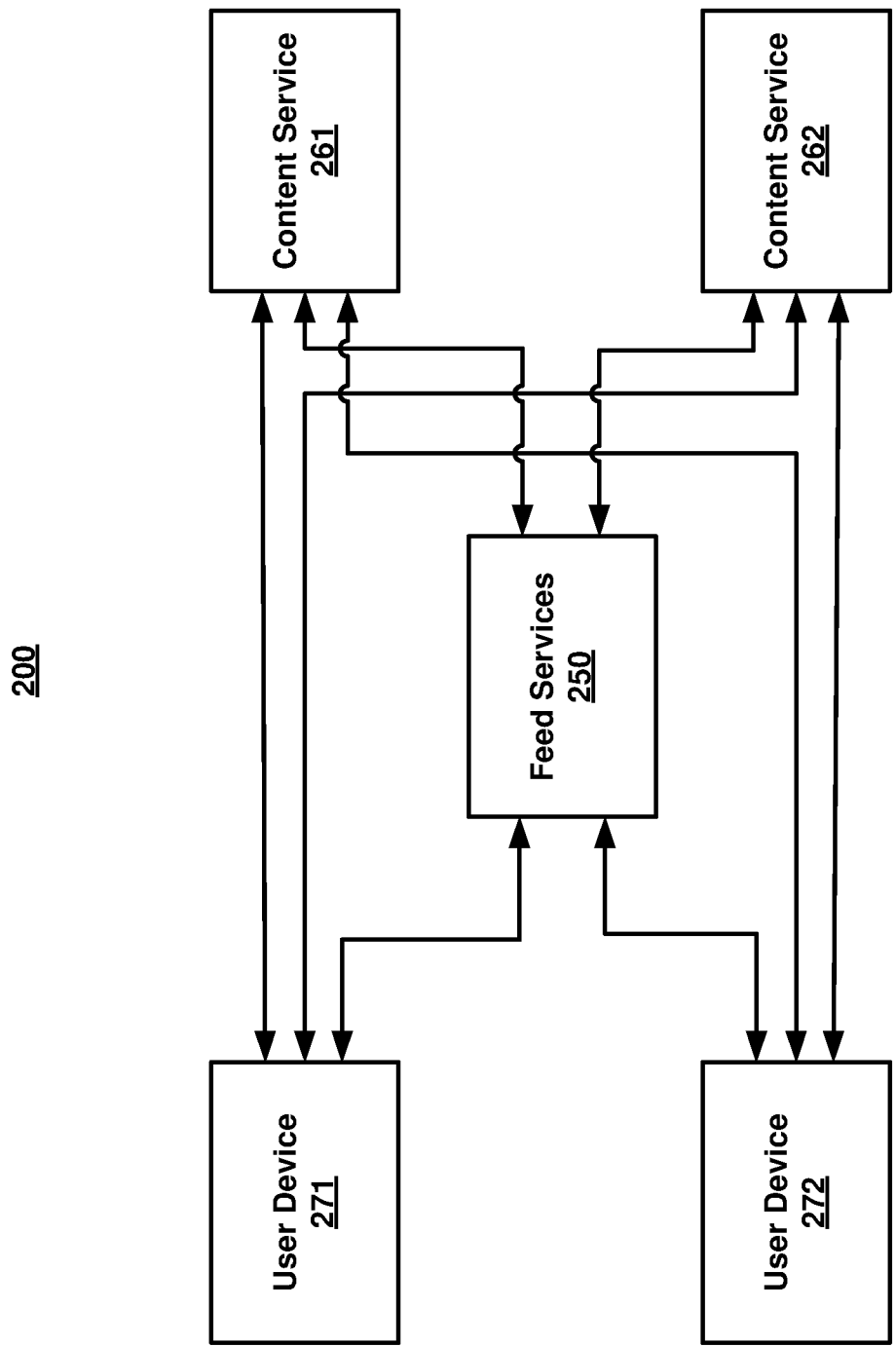
FIG. 2 is a block diagram illustrating an example of a system for a personalized feed.

FIG. 2 is a block diagram illustrating an example of a system (200). System 200 may be an example of system 100 of FIG. 1. System 200 is described as follows in accordance with some examples. System 200 includes feed services 250, content services 261 and 262, and user devices 271 and 272.

Feed services 250, content service 261, and content service 262 include one or more distributed systems.

Content services, including content services 261 and 262, manage, on behalf of users, various services that are associated with content. The services may include cloud services, access to various applications, communications services, security services, device management services, meeting management services, services that manage relationships with other users, news post management services, file services including the storing, access, and sharing of files by the users, or the like. Users of the services may obtain the service by communication via user devices, such as user devices 271 and 272, to the content services.

Feed services 250 operate as follows in some examples. Feed services 250 provide feed services to users. As part of these feed services, feed services 250 provide a content feed to each user via communication with a user device, such as user device 271 or 272, that is associated with the user. The content feed for each users includes feed items. Each feed item corresponds to a content item, which may be a document, news post, meeting, or the like that has relevance to the user. Feed services 250 requests the content items from the content services (e.g., content services 161 and 162). For each user, the content feed is personalized in at least one way, and causes the content feed to be displayed to the user in a personalized way. One way in which the content feed is personalized is through the inclusion of pill prompts that are unique and personalized to have particular relevance to the user. The pill prompts may include questions or other requests for specified information. In some examples, each of the feed items includes a personalized title, a personalized summary of the corresponding content item, and a personalized picture. In some examples, the personalization of the feed includes the bundling of feed items in a personalized way.

Feed services 250 requests ranked content from content services (e.g., contents service 261 and content service 262) and receives the ranked content in response to the request. The content services collect content associated with users from content services devices 250. The content collected includes documents that are associated with the user, such as document authored by the user, documents modified the user, documents read by the user, documents that colleagues of the user have modified or commented on, or the like. The content collected also includes meetings in which the user is a participant and meetings in which the user was mentioned.

The content collected also includes items on the user's calendar. The content collected also includes news items and articles that the user has read. The content collected also includes content that has been shared with the user by another user. The content collected also includes communications between the user and others, such as emails, instant messages, and other forms of communication that the user have received, that the user has sent, or the like.

The content collected by also includes personal contacts in the social media networks of the user. The content collected also includes content to which the user has subscribed, such as news posts from a news service to which the user has subscribed. The content collected also includes news posts by one or more entities with which the user is associated, such as the organization that the user works for. Content that a user cannot access, such as content that a user is not authorized to access, is excluded from the collected content. The content collected may also include authorized external content, such as information from a social networking service or the like. The content is ranked based on relevance ranking performed by the content services, in which pieces of content among the collected content are ranked based on their relative relevance to the user. The relevance ranking is used in determining which content will appear in the user's feed. After the ranked content is received, feed services 250 request the user profile of the user from the content services (e.g., content services 261 and 262). In some examples, feed services 250 request the user profile of the user after the user logs on to the service. After requesting the user profile, feed services 250 receives the user profile and then loads the user profile.

The user profile may include a variety of information about a user, including basic information such as name, job title, date of birth, employment information, residence information, or other suitable information. The user profile may also include information such as topics of interest to the user and other suitable information about the user. In some examples, the user profile consists of key/value pairs that are stored in a format such as a JavaScript Object Notation (JSON) file, a markdown format, or other suitable format. Each key/value pair consists of two linked elements: a "key" that is the identifier, and a "value" that is the corresponding value for that element. For example, each user may have a key/value pair where the key is "name" and the associated value is the name of that user, and each user may have another key/value pair where the key is "date of birth" and the associated value is the date of birth of that user. The user profile is dynamic and portions of the user profile change over time. The user profile may also include other suitable information that is associated with the user, such as the user's calendar and other suitable information.

The user profile may also include a graph of relationships between the user and other entities, including between the user and other users. The relationships may include, among other things, who the user's manager is, who the user is working with, or other suitable relationships. In some examples, content services (e.g., content services 261 and 262) use a distributed knowledge graph to tie together various information. The distributed knowledge graph is maintained by a graph database that is distributed across multiple data stores. The graph database may include, in various aspects: a relational database, a not-only-Structured-Query-Language (NoSQL) database, or another suitable database.

In the structure of the distributed knowledge graph, entities are modelled as nodes. The entities modeled as nodes include users, documents and other files, and the like. Each of the nodes in the distributed knowledge graph describes the corresponding entity and includes a set of accompanying properties of the corresponding entity, such as names, titles, ages, addresses, or the like. Each property can be considered a key/value pair that includes a name of the property and its corresponding value.

In the structure of the distributed knowledge graph, relationships between the entities and actions between the entities are modeled as edges between those entities. For example, if a user modifies as a document, this is represented in the graph structure with an edge between the user and the document, with the edge indicating that the user has modified the document. Similarly, authorship of a document by a user is represented in the graph structure as an edge between the user and the document, with the edge indicating the authorship, and a view of a document by a user may be represented in the graph structure as an edge indicating the document view. The distributed graph may be periodically queried in order to update the corresponding information in the user profile of each user. The periodic queries of the distributed graph are graph queries that are performed on the distributed knowledge graph. A graph query is query for particular data that is associated with the distributed knowledge graph. Execution of the graph query is performed by a graph server that communicates with the data stores that hold the data requested by the graph query. A graph query may be written in the language Cypher or another suitable pattern-matching language.

Some examples of system 200 do not use a distributed knowledge graph, but instead provide various user information, including productivity information that is associated with users, in other suitable ways. Such productivity information may include documents that the user has worked on, emails and other communication that the user has sent and received, and other suitable productivity information.

The large language model makes predictions about what will be most interesting and the most engaging, appealing, and meaningful to the user based on a variety of information that is known about the user, including past interactions, user preferences, what the user is working on, who the user is working with, what is on the user's calendar, or other suitable information. Based on the information that the large language model learns about the user from the user profile and the ranked content, the large language model determines things from the ranked content that the user should be aware of among the content, including information from news posts that may be of particular interest to the user, what the user missed while out of the office, mentions of the user in meetings that the user did not attend, information about a person that you have not met before that is participating in an upcoming meeting on the user's calendar, or the like. These predictions affect each aspect of the personalization of the feed.

The large language model is a large neural-network model that is composed of several layers of neurons. The first layer of the network takes in a sequence of words as input, and each subsequent layer processes the output of the previous layer. The output of the last layer is the model's prediction of the most likely meaning or interpretation of the input. The model is trained using a large dataset of text. During training, the model adjusts the weights of its neurons to better identify the relationships between words. This allows the model to better understand the context of the text and make more accurate predictions.

Some items discussed above as being part of the content collected by feed services 250 may instead be part of the user profile, and some element discussed as being part of the user profile may instead be part of the content collected by feed services 250. The precise elements that part of the user profile vary in different examples of system 200, but each of these elements is part of the input to the large language model whether the elements are part of the user profile or part of the content collected by feed services 250. As discussed above, feed services 250 provides a content feed for each user, where the content feed includes feed items. Each feed item corresponds to a content item, which may be a document, news post, meeting, or the like that has relevance to the user. Each feed item corresponds to a content item determined to be relevant to the user.

The feed items displayed in a content feed for each user is updated so that the feed apprises the user of information of relevance that are new relative to the last time that the user reviewed the content feed. The feed items are selected based on relevance to the user, in addition to providing new relevant information to the user. The relevance is determined based on the relevance ranking discussed above. The feed items may include, for example, feed items corresponding to content that is relevant to the user and predicted to be meaningful to that user that has been recently published or that the user has otherwise not yet seen, or that relate to recent changes such as title changes in co-workers, content that has been recently shared with the user, or the like. The feed items may include new content, content that the user has not yet read, or in which there is a change that is predicted to the significant to the user. For example, if the user has already read a news post but now the user's boss has commented on the news post, the feed item may appear again, with the personalization indicating what is newly of interest about the corresponding content. The content feed is personalized in one or more different ways. The personalization is entirely opt-in and is performed only for users that are logged in to the service.

Each feed item includes a title that identifies the corresponding content item, a preview/summary that previews/summarizes the corresponding content item and its relevance to the user, and a picture that represents the corresponding content item. Each feed item may also include a means for accessing the corresponding content item, such as a link to the corresponding content item. In some examples, one or more of the title, the preview/summary, and the picture are unique to that user and personalized for that user. The personalization of the title, summary, and picture is part of the personalization performed by the large language model when the large language model receives the user profile and the ranked content and determines what's interesting to the user based on the received inputs.

A typical news feed may include a summary of a corresponding news post that may include, for example, the first 250 characters of the corresponding news item, a random portion of the news item, or the like. Some news feeds may include a summary of the news post that is not directly taken from the news post, but which is the same for every user. In contrast, some examples of feed services 250 instead use the large language model to provide a summary that is unique and personalized for each user based on the information that is known about user, including the user's past interactions and preferences, and including the things that the large language model determines would be of particular interest and relevance to the user.

Accordingly, if two different users have the same piece of content in their feed, the summary in the personalized feed will be different for each user, based on the specific interests of that user, and those aspects of the piece of content that are relevant to that user. The content is analyzed by the large language model in a meaningful way and shown to the user in a meaningful and actionable way. In some examples, the title or the picture may similarly be personalized for each user. For example, if the large language model determines that a particular user likes impressionist art, and determines that the corresponding content item could is one that is suitably representable by impressionist art, the large language model may create a picture that represent the content item or aspects of the content item predicted to have particular relevance or interest to the user via a picture using impressionist art.

Some examples of feed services 250 causes feed items to be displayed in such a way that, in the display, the feed items are bundled in a personalized manner. In this way, some feed items in the content feed may be bundled together and some feed items may be unbundled. The content feed is caused to be displayed so that each bundle of content items also includes a summary of the bundle, where the summary is unique and personalized based on the particular user and the particular user's interests and the things that the particular user is familiar with. The bundling is a logical grouping of feed items, grouped based on a commonality between separate feed items in a way that makes sense for the particular user. In some examples, the large language model may use some form of characterization of each of the pieces of content, such as tagging, summarization, or the like, which may be used to assist the large language model in determining commonalities among pieces of content.

In some cases, the bundles may be bundles of like items. For example, one bundle may be a bundle of feed items each corresponding to a document, where the documents have a commonality for which it makes sense to group those documents together for that particular user. Another bundle may be a bundle of feed items each corresponding to a news post, where the news posts have a commonality for which it makes sense to group those news posts together for that particular user. Another bundle may be a bundle of feed items each corresponding to a meeting, where the meetings have a commonality for which it makes sense to group those meetings together for that particular user. Another bundle may be a bundle of disparate pieces of content, which may include for example one or more documents, one or more news posts, and one or more meetings, where the pieces of content associated with the feed items in that bundle have a commonality for which it makes sense to group those pieces of content together for that particular user.

Which feed items are bundled together is determined by the large language model during the personalization based on the ranked content and the user profile input to the large language model by reasoning over the pieces of content based on how the documents related to each other and bundling based on a commonality that would be of significance to the particular user based upon things that are known about the user. The bunding may also include bundling related to people. For instance, if there is a meeting in a user's calendar for which there are one or more attendees that the user has not previously met, those people may be identified, and the large language model may bundle commonalities between the user and other people, such as shared interests or other suitable commonalities. When suitable, the commonalities between the user and other suitable people may be included in the summary or in one or more of the personalized pill prompts.

In some examples, each feed item is caused to be displayed so that the feed item includes multiple personalized pills, in which each personalized pill prompt is included. The pills are user-selectable interactive pills that act as selectable buttons that are contextual and that contain a unique and personalized pill prompt of particular relevance to the user. The pill prompt in the pill of each feed item is a dynamically generated, personalized smart prompt that is related to the piece of content that corresponds to feed item. Each prompt is a request for specific information. For instance, example prompts for an example document for an example user are: "What are the goals of Monarch in Q2?", "How will Monarch improve the overall user experience?", and "What are the primary feature releases of Monarch?"

The large language model determines the pill prompts for each feed item based on the corresponding content, the user profile, and the ranked content. The large language model determines the pill prompt by determining information that the large language model predicts that the user may wish to know concerning the corresponding content item. The large language model also determines the response to each of the information requests in the pills, where the response contains the information requested in the pill prompt. In some examples, the dynamically generated prompts may be provided in another suitable manner than in a pill.

The content feed is also caused to be displayed such that the content feed includes global personalized pill prompts. For instance, the global personalized pill prompts may be displayed in pills that are included at or near the beginning of the content feed, prior to any of the feed items in the feed. The global pill prompts contain more general information requests of relevance to the user that are not limited to being about one particular feed item. The large language model determines the global pill prompts by determining information that the large language model predicts as being more general information that the user may wish to know that is related to information in the content feed but not limited in scope to one particular feed item. The large language model also determines the response to each of the global personalized pill prompts. The global pill prompts are unique and personalized for each user, although for global pill prompts, some prompts may be more general and be the same for multiple users. However, the response to the prompt is unique and personalized for each user, and the particular general prompts selected vary according to the interests and other particular aspects of the user. For example, a global pill prompt such as "Important things I've missed" may be provided to multiple users, but the response to the global pill prompt is unique and personalized for each user. Example of global personalized pill prompts may include, for instance, "Give me an update on Monarch," "Summarize all news of interest," "Who am I meeting this week that is new to me?", "What are Ashtok's current top of mind?", "What would Clippy do?", "Summarize all recent unread docs," and "What should I prepare for this week?"

As discussed above, the relevance ranking is used in the determination as to which items will appears on the user's feed, and personalization is performed by the large language models based on the feed items that appear in the user's feed. The personalization may include personalization that is based on the entire feed, as well as personalization that is performed on each feed item. For example, as discussed above, personalization that is based on the entire feed may include global pill prompts determined by the large language model based on the entire feed. As also discussed above, personalization that is performed on each feed item may include, for example, pill prompts in the pills for each feed item, and personalization of the title, summary, and picture of each feed item.

In some examples, each element of personalization is accomplished as follows for customization that is performed for a single feed item. For each element of personalization: at least one prompt is provided to the large language model, text that is associated with the feed item is provided to the large language model, and various information about the user is provided to the large language model. For instance, in some examples, the prompts, the associated text, and the user information are all provided as arguments in a function for a function call that is made to the large language model. The functional call may also have various other arguments in various examples, such as an argument that indicates a maximum length of the output to be provided and other suitable arguments. The text that is associated with the feed item may include, for example, in the case of a document or news article, the document or news article itself, or raw text that is extracted from the document or news article. In the case of a meeting, the text that is associated with the feed item may include, for example, a text transcript of the meeting.

The information about the user that is provided to the large language model includes information about the user in the form of key-value pairs in a format such as JSON, markdown, or another suitable format. For instance, the user information may include some subset of the user profile. For example, the user profile may include a plurality of key-value pairs, and the information about the user that provided to the large language model may provide a plurality of selected key-value pairs from among the key-value pairs in the user profile. For instance, particular information from the user profile that is relevant to the particular customization being performed may be provided to the large language model.

For instance, the user's skills may be provided as inputs to the large language model for one particular customization, and the user's interests may be provided as inputs to the large language model for another particular customization. Also, for some customizations, calendar items, documents recently modified by the user, or the like may be provided as inputs. In some examples, a particular number of calendar items or a particular number of documents may be provided as inputs to the large language model. For instance, in some examples, the N most recent calendar items for the user or the N most recent documents modified by the user may be included as inputs to the large language model.

The prompt is a text prompt that is provided to the large language model in a natural language format. The prompt may include, in natural language, text instructions for the large language model. The text instructions may include instructions to provide the element of personalization that is to be performed based on the associated text and the specific associated user information that is also being provided as an input to the large language model in order to perform that element of personalization.

In response to the prompt(s), the associated text, and the specific associated user information input to the large language model, the large language model outputs the requested element of personalization in accordance with the instructions in the prompt(s). The instruction(s) in the prompt(s) reference the associated text and the specific associated user information input to the large language model and explain how the large language model is to use these elements when following the instructions to provide the requested output. For elements of personalization that are based on more than one feed item, such as customized bundling and the general pill prompts, the personalization is accomplished in a similar manner as discussed above for one feed item, but text associated with each feed item that the large language model is to reason over is provided to the large language model.

Feed services 250 contain a large number of different prompts and different user information to provide, and feed services 250 determine both which prompt(s) to provide to the large language model and which specific user information to provide to the large language model based on the specific scenario. For instance, if the personalization is personalization that is provided for a specific feed item, the specific scenario includes the type of feed item for which personalization is being performed and the type of personalization being performed. The "type of feed item" refers to, for example, whether the feed item is a document, a news article, a meeting, or other suitable type of feed item.

The "type of personalization being performed" refers to, for example, whether pill prompts are being generated for the feed item, whether the title is being personalized, whether the summary is being personalized, whether the picture is being personalized, or the like. For example, different prompt(s), and different user information, is provided depending on whether the large language model is being asked to determine personalized pill prompts for a feed item, being asked to provide a personalized title, being asked to provide a personalized summary, or being asked to provide a personalized picture. Similarly, the prompt(s) and the user information provided varies depending on whether the feed item is, for example, a document, a news item, or a meeting.

For instance, one example of generating a personalized summary of a news article for a particular user may be performed as follows. This is by way of example to illustrate the principles involved and is not limiting in any way, and various other examples use various other suitable prompts, user information, or the like. In this example, feed services 250 use a File service Application Programming Interface (API) to extract the text of the news article in a raw text format. Feed services 250 obtain the user profile from the distributed knowledge graph. Feed services 250 use a function call to provide to the large language model: a natural language prompt, the extracted text of the news article in the raw text format, and, in a JSON format, key-value pairs from the user's user profile that are associated with the user's interests. Based on the particular scenario, including the fact that this is a news article and the fact that a personalized summary of the news article is to be generated, feed services 250 use the following natural language prompt, "Using the article {type} as source, find content that can match the reader's interest. If there is no matching content in the article {type} please say: this article will not appeal to the user. If there is a matching content, generate an exciting news summary by following these instructions. Write the news summary in the tone of a newspaper. Make the news exciting to get the reader's attention.\n---InDOCUMENT\n{text}\n--\n<|endofprompt|>\nA possible summary is\n\n." Here, the prompt includes various placeholders such as {type}, {text}, and nDOCUMENT. Feed services 250 fetch the content corresponding to the placeholders and replaces the placeholder with the corresponding fetched content prior to providing the prompt to the large language model in the function call.

An example of generating personalized pill prompts associated with a news article for a particular user may be performed as follows. This is by way of example to illustrate the principles involved and is not limiting in any way, and various other examples use various other suitable prompts, user information, or the like. In this example, feed services 250 use a File service Application Programming Interface (API) to extract the text of the news article in a raw text format. Feed services 250 obtains the user profile from the distributed knowledge graph. Feed services 250 use a function call to provide to the large language model: a natural language prompt, the extracted text of the news article in the raw text format, and, in a JSON format, key-value pairs from the user's user profile that are associated with the user's interests and with the user's skills. Based on the particular scenario, including the fact that this is a news article and the fact that pills for the news article are to be generated, feed services 250 use the following natural language prompt, "Using the article {type} as source, find content that can match the reader's interest. If there is no matching content in the article {type} please say: this article will not appeal to the user. If there is a matching content, generate 3 key questions the reader would likely want to know. Quote verbatim with an inline citation of the source you used in this format [Source: text].\n---InDOCUMENT\n{text}\n--\n<|endofprompt|>\nPotential questions the reader might have are\n\n." An alternative example prompt to generate the pill prompts is: "Carefully read the following document to find short questions (maximum six words) with paragraph-long answers. Use words and wordings from the document to craft both questions and answers. \n---\nNdocument\n{text}."

As discussed above, for each element of personalization, feed services 250 provide text associated with the feed item, user information, and one or more prompts to the large language model via a function call. The large language model then outputs a response to the functional call. Feed services 250 then receive the output of the function call from large language model. Feed services 250 then perform post processing on the output of the function call to the large language model. For example, the post processing of the output of the function call to the large language model may include parsing, removing words, characters and the like that will not be included and the feed, and cleaning up the output by adding text that will be used to fill out the output before the text is shown in the user's feed.

After determining the feed items to be provided to the user, including the personalized aspect, and after the post processing, feed services 250 causes the feed to be displayed to the user. This includes causing, via communication with the corresponding user device, a user interface on the user device to display the personalized content feed. The user interface displays the personalized content feed along with dynamically generated elements of personalization. In this way, the user interface may display the personalized feed to include personalized bundling of feed elements, with each of the feed elements also including personalized elements such as personalized titles, personalized summaries, and personalized pictures.

The user interface also displays personalized pill prompts, including global pill prompts and pill prompts for each feed item. The pill prompts are dynamically generated, personalized smart prompts that are provided in the user interface via user-interactive selectable pills. Feed services 250 enable dynamic interaction of the user with the feed via communication between feed services 250 and the user device. After displaying the content, including the pills, via the user interface, feed services 250 wait for a user to select one of the pills. For example, when a user, via the user device, clicks on a pill or otherwise selects a pill, feed services 250 cause the response to the information request in the pill to be displayed to the user via the user interface on the user device.

In some examples, when the user selects a pill, the response to the information request is provided as text or other information in a pop-up window. In some examples, when the user selects a pill, the response to the information request is provided as inline text or other inline information. In some examples, for some of the global pill prompts, the response to the information request is a subset of personalized feed. For instance, in one example, one of the global pill prompts is "important things I've missed this week." When the user selects this global pill prompt, the display of the personalized content feed is changed so that only those feed items that correspond to important things that the user has missed this week are displayed in the feed.

The global pill prompt and the particular subset of the personalized feed to be displayed based on the selecting the pill prompt are dynamically determined and are personal and unique to that particular user. When a subset of the feed items are displayed in this manner, the feed items are displayed in the same manner as when the entire feed is displayed, including the personalization for each feed item such as personalized pill prompts for the feed item, the personalized title, the personalized summary, and the personalized picture, but a personalized subset of the entire feed is displayed in response to the selection of the global pill prompt. When a subset of the feed is displayed in this manner, pills for each of the feed items in the displayed subset of the content feed may be selected as normal, with the display of the response provided in response to the selection of one of the pills in the same manner as is done when the entire feed is provided.

Example of content used for feeds items may include, for example, documents, news posts, meetings, or other suitable content. In various examples, any suitable text-based content may be used for both feed items and content collected by feed services 250 for input to the large language model. For instance, in the case of meetings, a meeting transcript may be used as the basis for analysis of the meeting. Similarly, in the case of some examples other non-text content, a transcript other text corresponding to the content may be used as the basis of analysis of the content.

For each feed item, the feed item may include additional useful information that is associated with the corresponding content item. For example, in the case of a meeting, the corresponding feed item may include a link to a video or audio recording of the meeting, a transcript summary for the meeting, an indication as to time(s) in the meeting in which the user was mentioned, action items discussed during the meeting, documents associated with the meeting, and an indication of attendees to the meeting that are new to the user. In the case of an upcoming meeting, examples of the corresponding feed item include a summary of recommended documents to prepare.

As users engage with the personalized feed, feed services 250 continually tracks the user's behavior and interests while the user is logged in and opting in, and the large language model is used to refine the personalization of the feed even further. In this way, feed services 250 provides each user with a feed that is unique and personal to the user in a highly engaging experience that evolves with each user's individual preferences. User's preferences and interaction history are stored and are provided as part of the content collected by feed services 250 or part of the user profile.

Feed services 250 may surface the personalized feed or a subset of the personalized feed in various user experiences while the user is logged in to the service. For example, the personalized feed or a subset of the personalized feed may be provided to the user while doing searches, while using communication or social networking applications, while using various applications, and during other suitable user experiences that are associated with the service. For instance, while a user is using the service to access documents, the user may be exposed to a subset of the feed that relates specifically to documents.

By tailoring the content and interactions to a user's specific interests, feed services 250 may keep users more engaged and interested in the content being presented. By providing a personalized feed based on user interactions and preferences, feed services 250 may ensure that the content being served to users is more relevant to the users interests and needs. By tracking user interactions and preferences, feed services 250 may make more accurate recommendations for new content due to a better understanding of what the user is interested in and may dynamically generate relevant prompts.

Further, by creating a more personalized and engaging experience, feed services 250 may increase user retention to the content feed. By providing a personalized feed via feed services 250, including a personalized title and summary, and bundling feed items in a personalized manner, the cognitive load of each user is reduced, the user's time is saved, the user receives more relevant and useful results, meaningful groupings of feed items are provided, and the feed allows for interactive consumption of content rather than random scrolling. Via the personalized feed provided by feed services 250, users are able to more easily discover what is going on and determine what is most relevant to them rather than being confronted with an overwhelming "wall of text" that is difficult to digest.

The personalized feed may be applied in a variety of different contexts in different examples. For example, a personalized feed may be employed in a social media application, in which the personalized feed consists of feed items that each corresponding to a social media post, which includes personalized bundling of the feed items, and which includes personalized pills, a personalized title, a personalized summary, and a personalized picture for each of the feed items. The personalized feed may also be applied to a news feed, in which the personalized feed consists of feed items that each corresponding to a news post, which includes personalized bundling of the feed items, and which includes personalized pills, a personalized title, a personalized summary, and a personalized picture for each of the feed items. More generally, the personalized feed may be used with regard to any text-based context sources. Sources that are not inherently text-based may be used if there is corresponding text—for example, a text transcript of a meeting, a video, or the like.

Illustrative User Interface

Figure 3:
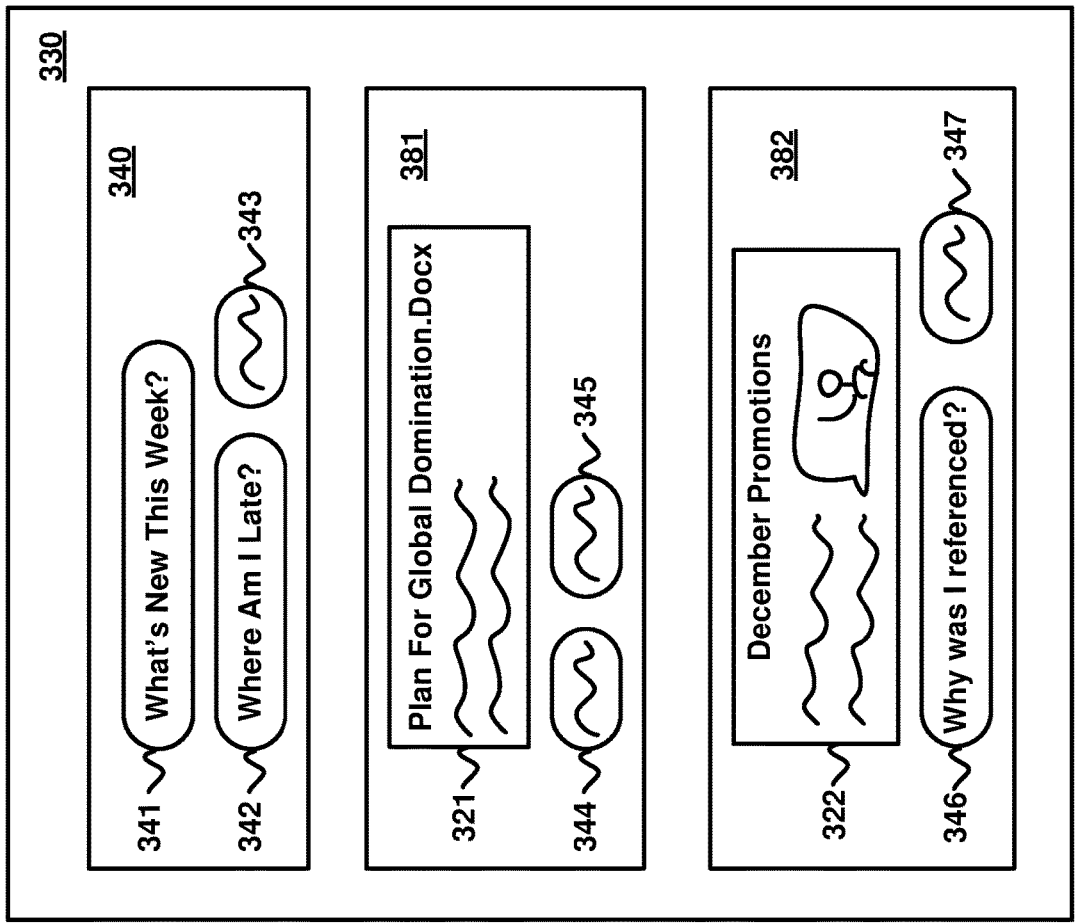
FIG. 3 is a diagram illustrating an example content feed that is displayed by an example user interface.

FIG. 3 is a diagram illustrating an example content feed (330) that is displayed by an example user interface, and which is caused to be displayed by an example of feed services (e.g., feed services 250 of FIG. 2). Content feed 330 includes global pill section 340, feed item 381, and feed item 382. Global pill section 340 includes global pills 341-343. Feed item 381 includes personalized content 321, pill 344, and pill 345. Feed item 382 includes personalized content 322, pill 346, and pill 347. Content feed 330 may include many more feed items and many more pills than shown in FIG. 3, which is illustrated by way of example only. In some examples, content feed 330 is provided via an example user interface that operates as follows.

Content feed 330 is displayed to a user via the user interface. Content feed 330 is a personalized content feed that includes dynamically generated elements of personalization. In this way, the user interface may display the personalized feed to include personalized bundling of feed elements, with each of the feed elements also including personalized elements such as personalized titles, personalized summaries, and personalized pictures. In some examples, content feed 330 is displayed in a manner that is scrollable so that the user may scroll to see additional elements of content feed 330, such as additional feed items. As discussed above, content feed 330 includes pills, including global pills such as global pills 341-343, and pills for each feed item such as pills 344-347. Each of the pills (e.g., 341-347) includes a pill prompt. The pill prompts are dynamically generated, personalized smart prompts that are provided in the user interface. The user interface enables dynamic interaction of the user with content feed 330. Each of the pills is a user-interactive selectable pill. For example, when a user clicks on a pill or otherwise selects a pill, the user interface causes the response to the information requested in the pill to be displayed to the user via the user interface.

In some examples, when the user selects a pill, the response to the information request is provided as text or other information in a pop-up window. In some examples, when the user selects a pill, the response to the information request is provided as inline text or other inline information. In some examples, for the response for some of the global pill prompts, the information request is a subset of personalized feed. For instance, in one example, one of the global pill prompts is "What's New This Week?" Accordingly, in some examples, pill 342 is displayed as a visible rectangle, oval, or other shape that displays the text "What's New This Week?" within the shape, and the user may select pill 342 by moving the mouse cursor within the area of that shape and then left-clicking the mouse button. Pill 342 may be selected in other suitable ways in other examples. In this example, when the user selects pill 342, the personalized content feed is changed so that only those feed items that correspond to what's new this week are displayed in the feed.

In this example, the global pill prompt and the particular subset of the personalized feed that are caused to be displayed based on the selecting the pill prompt are dynamically determined and are personal and unique to that particular user. When a subset of the feed items is displayed in this manner, the feed items are displayed in the same manner as when the entire feed is displayed, including the personalization for each feed item such as personalized pill prompts for the feed item, the personalized title, the personalized summary, and the personalized picture, but a personalized subset of the entire feed is displayed in response to the selection of the global pill prompt. When a subset of the feed is displayed in this manner, pills for each of the feed items in the displayed subset of the content feed may be selected as normal, with the display of the response provided in response to the selection of one of the pills in the same manner as is done when the entire feed is provided.

Each of the feed items includes content and pills. For example, as discussed above, feed item 381 includes content 321, pill 344, and pill 345, and feed item 382 includes content 322, pill 346, and pill 347. For instance, in some examples, for pill 346, as illustrated in FIG. 3, a rectangle, oval, or other shape is displayed in which the shape includes the text "Why was I referenced?" A user may select one of these pills by moving the mouse cursor within the area of the shape and then left-clicking the mouse button. The pills may be selected in other suitable ways in other examples. When a user selects one of these pills, the user interface causes the answer to the question to be displayed. For instance, in various examples, the answer may be displayed via text in a popup window, via inline text, or in another suitable manner.

Example of content (e.g., content 321 and content 322) used for feed items may include, for example, documents, news posts, meetings, or other suitable content. In various examples, any suitable text-based content may be used for the feed items. For each feed item, the content may include additional useful information that is associated with the corresponding content item. For example, in the case of a meeting, the corresponding feed item may include a link to a video or audio recording of the meeting, a transcript summary for the meeting, an indication as to time(s) in the meeting in which the user was mentioned, action items discussed during the meeting, documents associated with the meeting, and an indication of attendees to the meeting that are new to the user. In the case of an upcoming meeting, examples of the content in the corresponding feed item include a summary of recommended documents to prepare.

Illustrative Processes

Figure 4:
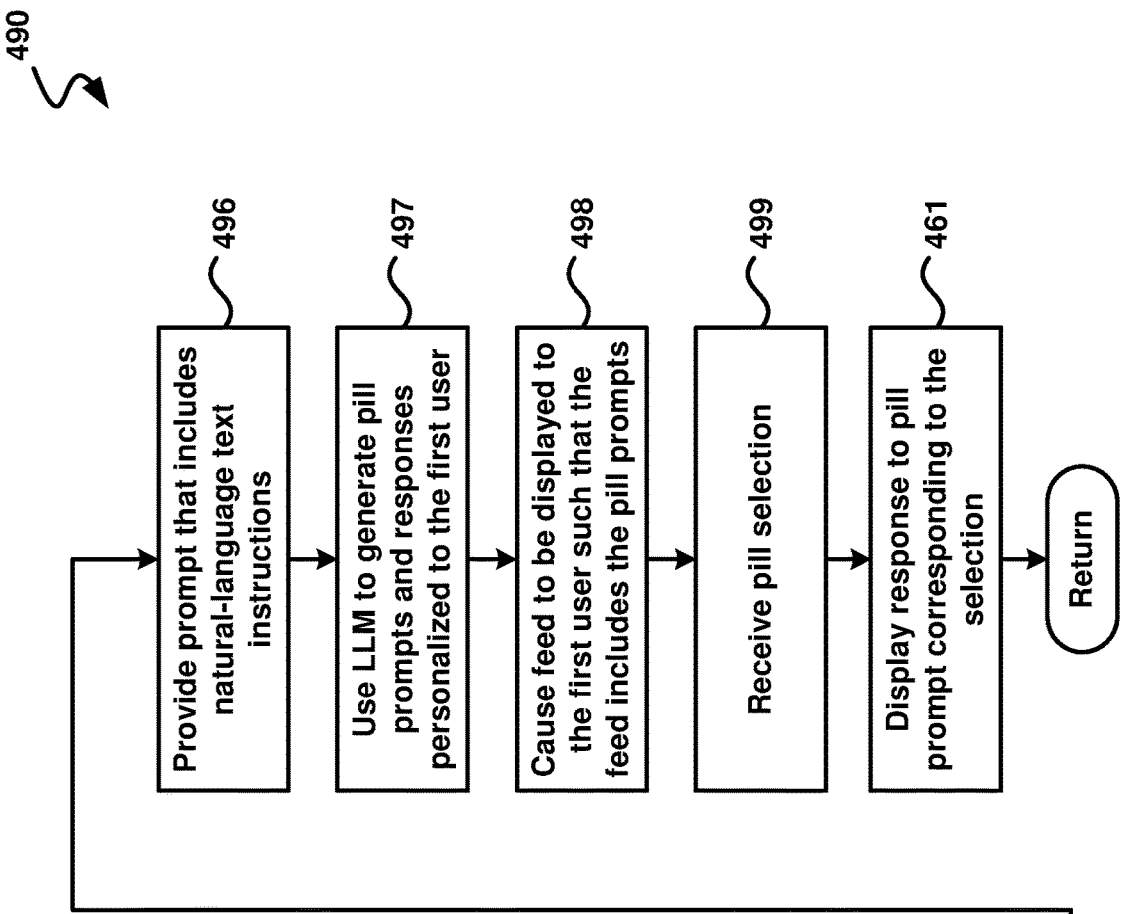
FIG. 4 is a flow diagram illustrating an example process for a personalized feed.

FIG. 4 is a diagram illustrating an example dataflow for a process (390) for a personalized feed. In some examples, process 490 may be performed by an example of one of the feed service devices 151 or 152 of FIG. 1, by an example of feed services 250 of FIG. 2, by an example of device 500 of FIG. 5, or the like. In some examples, process 490 proceeds as follows.

Step 491 occurs first. At step 491, ranked content that is associated with a first user is requested. As shown, step 492 occurs next. At step 492, responsive to requesting the ranked content, the ranked content is received, such that the ranked content is ranked based on a relevance of content among the ranked content to first user. As shown, step 493 occurs next. At step 493, a first profile that is associated with the first user is requested. The first profile includes a plurality of key-value pairs. As shown, step 494 occurs next. At step 494, Responsive to requesting the first profile, the first profile is received. As shown, step 495 occurs next. At step 495, a plurality of selected key-value pairs from the first profile is provided.

As shown, step 496 occurs next. At step 496, a first prompt is provided such that the first prompt includes natural-language text instructions. As shown, step 497 occurs next. At step 497, based on the first prompt, the plurality of selected key-value pairs, and the ranked content, a large language model is used to generate: a plurality of pill prompts associated with the ranked content, such that the pill prompts are information requests that are unique and personalized to have particular relevance to the first user based on the plurality of selected key-value pairs, and a response to each pill prompt of the plurality of pill prompts such that the response includes content that corresponds to the requested information.

As shown, step 498 occurs next. At step 498, a content feed is caused to be displayed to the first user, including causing a plurality of selectable pills to be displayed to the first user as part of the displayed content feed such that each selectable pill of the plurality of selectable pills includes a corresponding pill prompt of the plurality of pill prompts. As shown, step 499 occurs next. At step 499, a selection of one of the selectable pills of the plurality of selectable pills is received. As shown, step 461 occurs next. At step 461, responsive to the selection of one of the selectable pills, causing the response to the pill prompt that corresponds to the selection to be displayed to the first user. The process may then advance to a return block, where other processing is resumed.

Illustrative Devices/Operating Environments

Figure 5:
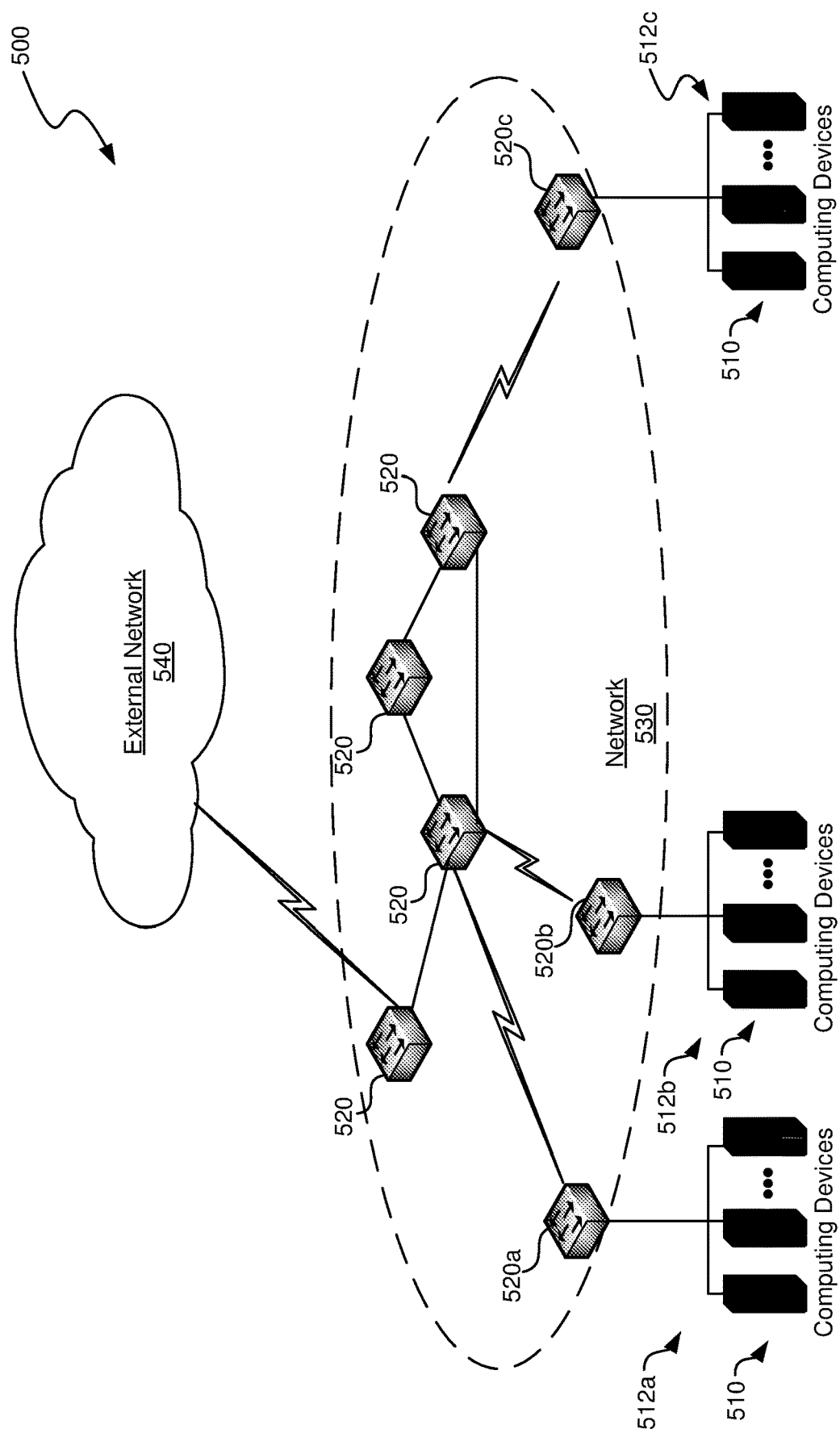
FIG. 5 is a block diagram illustrating one example of a suitable environment in which aspects of the technology may be employed.

FIG. 5 is a diagram of environment 500 in which aspects of the technology may be practiced. As shown, environment 500 includes computing devices 510, as well as network nodes 520, connected via network 530. Even though particular components of environment 500 are shown in FIG. 5, in other examples, environment 500 can also include additional and/or different components. For example, in certain examples, the environment 500 can also include network storage devices, maintenance managers, and/or other suitable components (not shown). Computing devices 510 shown in FIG. 5 may be in various locations, including a local computer, on premise, in the cloud, or the like. For example, computer devices 510 may be on the client side, on the server side, or the like.

As shown in FIG. 5, network 530 can include one or more network nodes 520 that interconnect multiple computing devices 510, and connect computing devices 510 to external network 540, e.g., the Internet or an intranet. For example, network nodes 520 may include switches, routers, hubs, network controllers, or other network elements. In certain examples, computing devices 510 can be organized into racks, action zones, groups, sets, or other suitable divisions. For example, in the illustrated example, computing devices 510 are grouped into three host sets identified individually as first, second, and third host sets 512a-112c. In the illustrated example, each of host sets 512a-512c is operatively coupled to a corresponding network node 520a-520c, respectively, which are commonly referred to as "top-of-rack" or "TOR" network nodes. TOR network nodes 520a-520c can then be operatively coupled to additional network nodes 520 to form a computer network in a hierarchical, flat, mesh, or other suitable types of topology that allows communications between computing devices 510 and external network 540. In other examples, multiple host sets 512a-512c may share a single network node 520. Computing devices 510 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 510 may be individually configured to provide computing, storage, and/or other suitable computing services.

In some examples, one or more of the computing devices 510 is a device that is configured to be at least part of a system for providing a personalized feed.

Illustrative Computing Device

FIG. 6 is a diagram illustrating one example of computing device 600 in which aspects of the technology may be practiced. Computing device 600 may be virtually any type of general- or specific-purpose computing device. For example, computing device 600 may be a user device such as a desktop computer, a laptop computer, a tablet computer, a display device, a camera, a printer, or a smartphone. Likewise, computing device 600 may also be a server device such as an application server computer, a virtual computing host computer, or a file server computer, e.g., computing device 600 may be an example of computing device 510 or network node 520 of FIG. 5. Likewise, computer device 600 may be an example any of the devices, a device within any of the distributed systems, illustrated in or referred to in any of the above figures, as discussed in greater detail below. As illustrated in FIG. 6, computing device 600 may include processing circuit 610, operating memory 620, memory controller 630, bus 640, data storage memory 650, input interface 660, output interface 670, and network adapter 680. Each of these afore-listed components of computing device 600 includes at least one hardware element.

Computing device 600 includes at least one processing circuit 610 configured to execute instructions, such as instructions for implementing the herein-described workloads, processes, and/or technology. Processing circuit 610 may include a microprocessor, a microcontroller, a graphics processor, a coprocessor, a field-programmable gate array, a programmable logic device, a signal processor, and/or any other circuit suitable for processing data. The aforementioned instructions, along with other data (e.g., datasets, metadata, operating system instructions, etc.), may be stored in operating memory 620 during run-time of computing device 600. Operating memory 620 may also include any of a variety of data storage devices/components, such as volatile memories, semi-volatile memories, random access memories, static memories, caches, buffers, and/or other media used to store run-time information. In one example, operating memory 620 does not retain information when computing device 600 is powered off. Rather, computing device 600 may be configured to transfer instructions from a non-volatile data storage component (e.g., data storage component 650) to operating memory 620 as part of a booting or other loading process. In some examples, other forms of execution may be employed, such as execution directly from data storage component 650, e.g., execute In Place (XIP).

Operating memory 620 may include 4th generation double data rate (DDR4) memory, $3^{rd}$ generation double data rate (DDR3) memory, other dynamic random access memory (DRAM), High Bandwidth Memory (HBM), Hybrid Memory Cube memory, 3D-stacked memory, static random access memory (SRAM), magnetoresistive random access memory (MRAM), pseudorandom random access memory (PSRAM), and/or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 610 via memory controller 630 in channels. One example of computing device 600 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 620 specifically does not include or encompass communications media, any communications medium, or any signals per se.

Memory controller 630 is configured to interface processing circuit 610 to operating memory 620. For example, memory controller 630 may be configured to interface commands, addresses, and data between operating memory 620 and processing circuit 610. Memory controller 630 may also be configured to abstract or otherwise manage certain aspects of memory management from or for processing circuit 610. Although memory controller 630 is illustrated as single memory controller separate from processing circuit 610, in other examples, multiple memory controllers may be employed, memory controller(s) may be integrated with operating memory 620, and/or the like. Further, memory controller(s) may be integrated into processing circuit 610. These and other variations are possible.

In computing device 600, data storage memory 650, input interface 660, output interface 670, and network adapter 680 are interfaced to processing circuit 610 by bus 640. Although FIG. 6 illustrates bus 640 as a single passive bus, other configurations, such as a collection of buses, a collection of point-to-point links, an input/output controller, a bridge, other interface circuitry, and/or any collection thereof may also be suitably employed for interfacing data storage memory 650, input interface 660, output interface 670, and/or network adapter 680 to processing circuit 610.

In computing device 600, data storage memory 650 is employed for long-term non-volatile data storage. Data storage memory 650 may include any of a variety of non-volatile data storage devices/components, such as non-volatile memories, disks, disk drives, hard drives, solid-state drives, and/or any other media that can be used for the non-volatile storage of information. However, data storage memory 650 specifically does not include or encompass communications media, any communications medium, or any signals per se. In contrast to operating memory 620, data storage memory 650 is employed by computing device 600 for non-volatile long-term data storage, instead of for runtime data storage.

Also, computing device 600 may include or be coupled to any type of processor-readable media such as processor-readable storage media (e.g., operating memory 620 and data storage memory 650) and communication media (e.g., communication signals and radio waves). While the term processor-readable storage media includes operating memory 620 and data storage memory 650, the term "processor-readable storage media," throughout the specification and the claims, whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 600 also includes input interface 660, which may be configured to enable computing device 600 to receive input from users or from other devices. In addition, computing device 600 includes output interface 670, which may be configured to provide output from computing device 600. In one example, output interface 670 includes a frame buffer, graphics processor, graphics processor or accelerator, and is configured to render displays for presentation on a separate visual display device (such as a monitor, projector, virtual computing client computer, etc.). In another example, output interface 670 includes a visual display device and is configured to render and present displays for viewing. In yet another example, input interface 660 and/or output interface 670 may include a universal asynchronous receiver/transmitter (UART), a Serial Peripheral Interface (SPI), Inter-Integrated Circuit (I2C), a General-purpose input/output (GPIO), and/or the like. Moreover, input interface 660 and/or output interface 670 may include or be interfaced to any number or type of peripherals.

In the illustrated example, computing device 600 is configured to communicate with other computing devices or entities via network adapter 680. Network adapter 680 may include a wired network adapter, e.g., an Ethernet adapter, a Token Ring adapter, or a Digital Subscriber Line (DSL) adapter. Network adapter 680 may also include a wireless network adapter, for example, a Wi-Fi adapter, a Bluetooth adapter, a ZigBee adapter, a Long-Term Evolution (LTE) adapter, SigFox, LoRa, Powerline, or a 6G adapter.

Although computing device 600 is illustrated with certain components configured in a particular arrangement, these components and arrangements are merely one example of a computing device in which the technology may be employed. In other examples, data storage memory 650, input interface 660, output interface 670, or network adapter 680 may be directly coupled to processing circuit 610 or be coupled to processing circuit 610 via an input/output controller, a bridge, or other interface circuitry. Other variations of the technology are possible.

Some examples of computing device 600 include at least one memory (e.g., operating memory 620) having processor-executable code stored therein, and at least one processor (e.g., processing unit 610) that is adapted to execute the processor-executable code, wherein the processor-executable code includes processor-executable instructions that, in response to execution, enables computing device 600 to perform actions, where the actions may include, in some examples, actions for one or more processes described herein, such as the process shown in FIG. 4, as discussed in greater detail above.

The above description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on," and includes the option of being based on additional factors, some of which may not be described herein. As another example, the term "via" is not exclusive, and is equivalent to the term "via, at least in part," and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof. The term "cloud" or "cloud computing" refers to shared pools of configurable computer system resources and higher-level services over a wide-area network, typically the Internet. "Edge" devices refer to devices that are not themselves part of the cloud but are devices that serve as an entry point into enterprise or service provider core networks.

Conclusion

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus, comprising:
a device including at least one memory having processor-executable code stored therein, and at least one processor that is adapted to execute the processor-executable code, wherein the processor-executable code includes processor-executable instructions that, in response to execution, enable the device to perform actions, including:
submitting a request via a feed service device to request ranked content that is associated with a first user;
responsive to requesting the ranked content, receiving the ranked content, at the feed service device, such that the ranked content is ranked based on a relevance of content among the ranked content to the first user;
accessing a first profile that is associated with the first user, wherein the first profile includes a plurality of key-value pairs, each key-value pair of the plurality of key-value pairs including two linked elements, the two linked elements including a key that is an identifier of the key-value pair and a value that is a corresponding value for the key;
selecting at least some of the plurality of key-value pairs from the first profile for transmission to a large language model;
generating a first prompt such that the first prompt includes natural-language text instructions for the large language model;
providing the first prompt, the plurality of selected key-value pairs, and the ranked content to the large language model as input;
using the large language model to generate a plurality of pill prompts associated with the ranked content and a response to each pill prompt of the plurality of pill prompts, such that the pill prompts are personalized information requests that are personalized to have relevance to the first user based on the plurality of selected key-value pairs, and the response to each pill prompt includes content that corresponds to the requested information;
transmitting, via the feed service device, a content feed to a user device of the first user; causing the content feed to be displayed on the user device, including causing a plurality of selectable pills to be displayed on the user device as part of the displayed content feed such that each selectable pill of the plurality of selectable pills includes a corresponding pill prompt of the plurality of pill prompts;
receiving a selection of one of the selectable pills of the plurality of selectable pills via the user device;
responsive to the selection of one of the selectable pills, causing the response to the pill prompt that corresponds to the selection to be displayed on the user device; and
using the large language model to determine logical groupings of feed items among the feed items such that the logical groupings are based on commonalities among the feed items, wherein causing the content feed to be displayed on the user device includes causing the content feed to be displayed on the user device such that logical groupings of feed items are displayed together, and wherein each logical grouping of the logical groupings has a summary that summarizes the logical grouping, the actions further including: based on the ranked content and the first profile, using the large language model to generate the summaries of the logical groupings such that the summaries are unique to the first user and such that the summaries are personalized to the first user.

2. The apparatus of claim 1, wherein the response to the pill prompt that corresponds to the selection to be displayed to the first user is a personalized subset of the content feed.

3. The apparatus of claim 1, wherein the content feed includes feed items, and wherein each of the feed items corresponds to separate content from among the ranked content.

4. The apparatus of claim 3, wherein at least one of the feed items corresponds to a document, a news post, or a meeting.

5. The apparatus of claim 3, wherein using the large language model to generate the plurality of pill prompts is accomplished such that a first pill prompt of the plurality of pill prompts is general with respect to the content feed, and such that a second pill prompt of the plurality of pill prompts is associated with a first feed item of the feed items.

6. The apparatus of claim 3, wherein using the large language model to generate the plurality of pill prompts is accomplished such that for each feed item of the feed items, at least two pill prompts of the plurality of pill prompts pertains to that feed item, and such that at least two other pill prompts of the plurality of pill prompts are general with respect to the content feed.

7. The apparatus of claim 3, wherein each feed item of the feed items includes a summary that summarizes the corresponding content, the actions further including: based on the ranked content and the first profile, using the large language model to generate the summaries of the feed items such the summaries are unique to the first user and such that the summaries are personalized to the first user.

8. The apparatus of claim 3, wherein each feed item of the feed items includes a title, the actions further including: based on the ranked content and the first profile, using the large language model to generate the titles of the feed items such the titles are unique to the first user and such that the titles are personalized to the first user.

9. The apparatus of claim 3, wherein each feed item of the feed items includes a picture that represents that feed item, the actions further including: based on the ranked content and the first profile, using the large language model to generate the pictures of the feed items such the pictures are unique to the first user and such that the pictures are personalized to the first user.

10. The apparatus of claim 1, wherein using the large language model to determine the logical groupings is accomplished by: based on the ranked content and the first profile, using the large language model to generate commonalities among plurality of feed items such that the commonalities are personalized to the first user, and determining the logical groupings based on the personalized commonalities.

11. A method, comprising:
receiving, at a feed service device, content that is associated with a first user;
accessing a user profile that is associated with the first user, wherein the profile includes a plurality of key-value pairs, each key-value pair of the plurality of key-value pairs including two linked elements, the two linked elements including a key that is an identifier of the key-value pair and a value that is a corresponding value for the key;

selecting at least some of the plurality of key-value pairs from the profile for transmission to a large language model;

generating a first prompt such that the first prompt includes natural-language text instructions for the large language model;

providing the first prompt, the selected plurality of key-value pairs, and the content to the large language model as input;

using the large language model to generate a plurality of pill prompts associated with the content, such that the pill prompts of the plurality of pill prompts are unique and personalized to have particular relevance to the first user based on the user profile;

transmitting, via the feed service device, a content feed to a user device of the first user;

causing the content feed to be displayed to on the user device such that the content feed includes the plurality of pill prompts;

responsive to a selection of a pill prompt of the plurality of pill prompts, causing content that is associated with the selected pill prompt to be displayed on the user device, and using the large language model to determine logical groupings of feed items among the feed items such that the logical groupings are based on commonalities among the feed items, wherein causing the content feed to be displayed on the user device includes causing the content feed to be displayed on the user device such that logical groupings of feed items are displayed together, and wherein each logical grouping of the logical groupings has a summary that summarizes the logical grouping; and based on ranked content associated with the first user and the user profile, using the large language model to generate the summaries of the logical groupings such that the summaries are unique to the first user and such that the summaries are personalized to the first user.

12. The method of claim 11, wherein the content feed includes feed items, and wherein each of the feed items corresponds to separate content from among the content.

13. The method of claim 12, wherein using the large language model to generate the plurality of pill prompts is accomplished such that for each feed item of the feed items, at least two pill prompts of the plurality of pill prompts pertains to that feed item, and such that at least two other pill prompts of the plurality of pill prompts are general with respect to the content feed.

14. The method of claim 12, wherein each feed item of the feed items includes a summary that summarizes the corresponding content, the method further comprising: based on the content and the user profile, using the large language model to generate the summaries of the feed items such the summaries are unique to the first user and such that the summaries are personalized to the first user.

15. A processor-readable storage medium, having stored thereon processor-executable code that, upon execution by at least one processor, enables actions, comprising:
receiving, at a feed service device, ranked content that is associated with a first user;
receiving a first profile that is associated with the first user, wherein the first profile includes a plurality of key-value pairs, each key-value pair of the plurality of key-value pairs including two linked elements, the two linked elements including a key that is an identifier of the key-value pair and a value that is a corresponding value for the key;

selecting a plurality of key-value pairs from the first profile;

generating a first prompt such that the first prompt includes natural-language text instructions for a large language model;

providing the first prompt, the selected plurality of key-value pairs, and the ranked content to the large language model as input;

using the large language model to generate a plurality of pill prompts associated with the ranked content based on the first prompt and the selected plurality of key-value pairs, such that the pill prompts of the plurality of pill prompts are unique and personalized to have relevance to the first user based on the selected plurality of key-value pairs;

generating a response to each pill prompt of the plurality of pill prompts using the large language model;

transmitting, via the feed service device, a content feed to a user device of the first user;

causing the content feed to be displayed on the user device such that the content feed includes the plurality of pill prompts, including causing a plurality of selectable pills to be displayed on the user device as part of the displayed content feed such that each selectable pill of the plurality of selectable pills includes a corresponding pill prompt of the plurality of pill prompts;

receiving a selection of one of the selectable pills of the plurality of selectable pills via the user device;

responsive to the selection of one of the selectable pills, causing the response to the pill prompt that corresponds to the selection to be displayed on the user device; and using the large language model to determine logical groupings of feed items among the feed items such that the logical groupings are based on commonalities among the feed items, wherein causing the content feed to be displayed on the user device includes causing the content feed to be displayed on the user device such that logical groupings of feed items are displayed together, and wherein each logical grouping of the logical groupings has a summary that summarizes the logical grouping, the actions further including: based on the ranked content and the first profile, using the large language model to generate the summaries of the logical groupings such that the summaries are unique to the first user and such that the summaries are personalized to the first user.

16. The processor-readable storage medium of claim 15, wherein the content feed includes feed items, and wherein each of the feed items corresponds to separate content from among the ranked content.

17. The processor-readable storage medium of claim 16, wherein using the large language model to generate the plurality of pill prompts is accomplished such that for each feed item of the feed items, at least two pill prompts of the plurality of pill prompts pertains to that feed item, and such that at least two other pill prompts of the plurality of pill prompts are general with respect to the content feed.

18. The processor-readable storage medium of claim 16, wherein each feed item of the feed items includes a summary that summarizes the corresponding content, the actions further comprising: based on the ranked content and the first profile, using the large language model to generate the summaries of the feed items such the summaries are unique to the first user and such that the summaries are personalized to the first user.

\* \* \* \* \*